Oct. 31, 1967 P. C. BROCKETT 3,350,547

COUNTING CIRCUIT FOR TRAFFIC DETECTION PULSE INPUTS AT RANDOM PULSE RATES TEMPORARILY EXCEEDING THE AVERAGE RATE

Filed March 6, 1964 9 Sheets-Sheet 1

INVENTOR.
PETER C. BROCKETT

BY

Edward H. Evans

ATTORNEY

INVENTOR
PETER C. BROCKETT

BY Edward W. Eaves
ATTORNEY

Oct. 31, 1967 P. C. BROCKETT 3,350,547

COUNTING CIRCUIT FOR TRAFFIC DETECTION PULSE INPUTS AT RANDOM PULSE RATES TEMPORARILY EXCEEDING THE AVERAGE RATE

Filed March 6, 1964 9 Sheets-Sheet 3

INVENTOR
PETER C. BROCKETT

BY

Edward H. Eames

ATTORNEY

INVENTOR.
PETER C. BROCKETT

BY

Edward W. Eames

ATTORNEY

INVENTOR.
PETER C. BROCKETT
BY
Edward H. Eames
ATTORNEY

Oct. 31, 1967 P. C. BROCKETT 3,350,547
COUNTING CIRCUIT FOR TRAFFIC DETECTION PULSE INPUTS AT RANDOM
PULSE RATES TEMPORARILY EXCEEDING THE AVERAGE RATE
Filed March 6, 1964 9 Sheets-Sheet 6

INVENTOR.
PETER C. BROCKETT
BY
Edward W. Eames
ATTORNEY

INVENTOR.
PETER C. BROCKETT
BY
Edward W. Evans
ATTORNEY

INVENTOR
PETER C. BROCKETT
BY
Edward W. Eaves
ATTORNEY

INVENTOR
PETER C. BROCKETT
BY
Edward H. Eames
ATTORNEY

United States Patent Office 3,350,547

Patented Oct. 31, 1967

3,350,547

COUNTING CIRCUIT FOR TRAFFIC DETECTION PULSE INPUTS AT RANDOM PULSE RATES TEMPORARILY EXCEEDING THE AVERAGE RATE

Peter C. Brockett, Milford, Conn., assignor to Laboratory for Electronics, Inc., Boston, Mass., a corporation of Delaware Filed Mar. 6, 1964, Ser. No. 349,985
14 Claims. (Cl. 235—92)

ABSTRACT OF THE DISCLOSURE

A counting circuit having plural channel input for traffic detectors, the circuit having a first counting chain of flip-flops advanced by random traffic actuated input pulses, and having a second counting chain of flip-flops controlled by a multivibrator which is normally free running except when held by a clamp through a comparator, the multivibrator being clamped whenever the two counting chains are in coincidence but being operated to advance the second counting chain at periodic intervals whenever the two chains are not in coincidence. Solid state circuitry and individual very short pulse forming and shaping networks for the input channels are provided to separate pulses having a high degree of overlap.

Figure 1A:
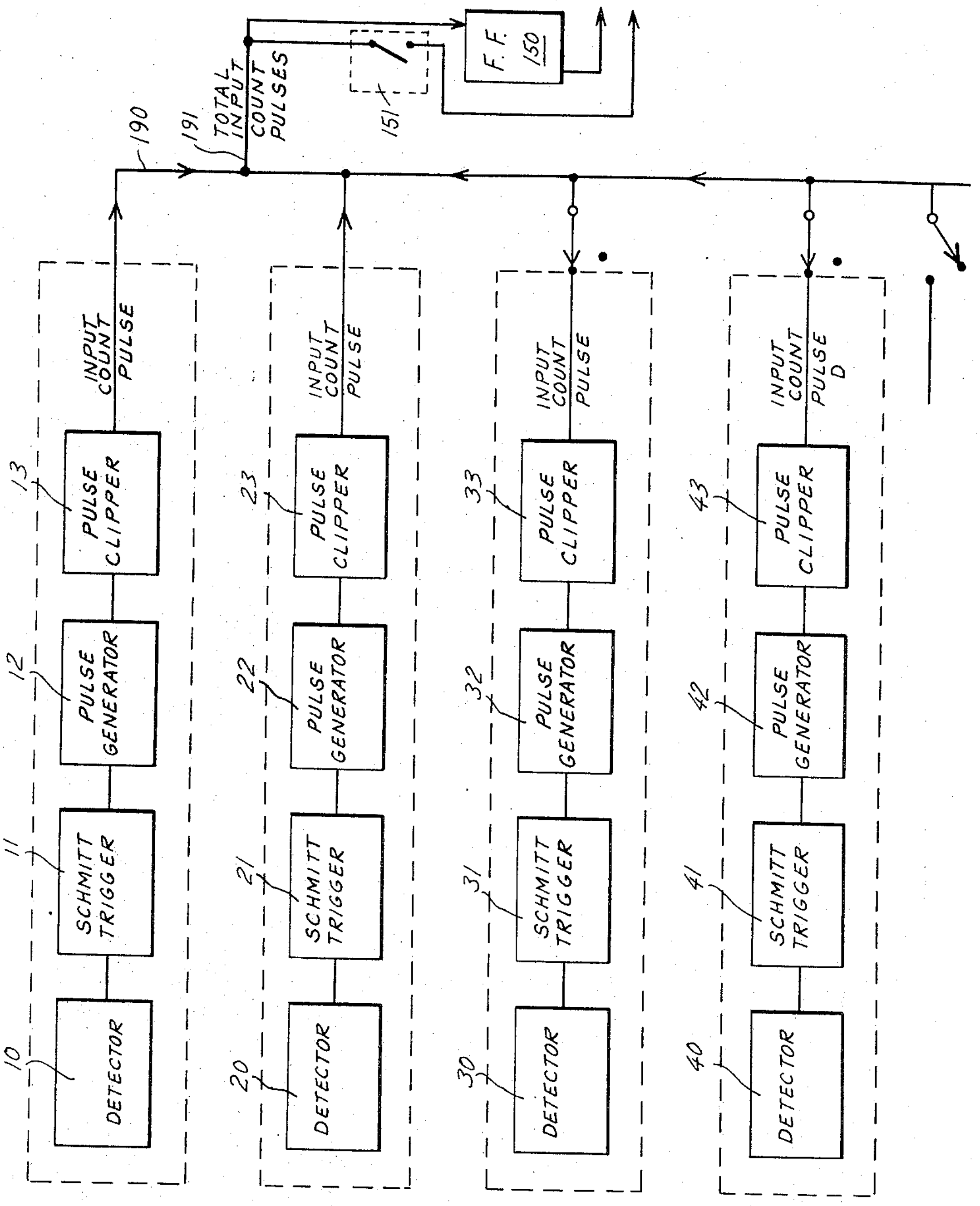

This invention relates generally to counting circuits and more particularly to such a circuit for use in an application where a plurality of pulses are received at random without loss in counting accuracy due to substantial coincidence of pulses received.

The invention is described in terms of a counting circuit adapted for use in traffic counting applications where vehicle counts from more than one vehicle-actuated detector are to be counted into one counter and is especially suitable for counting applications on multilane, high capacity highways where separation of vehicle pulses from different detectors on the same facility is a problem.

The device disclosed is shown with 14 detectors and two binary counting chains providing capacity for counting so that there is storage for 8 detector actuations which occur virtually at the same instant. If the vehicle counting application with 14 detectors requires storage for more than 8 actuations the counting units in each of the binary chains can be increased to provide greater storage capacity. Therefore, although the invention is described in terms of the utilization of 14 detectors and 8 coincident detector actuations, the principle of the invention is not so limited, the system being indefinitely expansible.

The unit is so designed as to separate pulses to within 10 microseconds from each other or in terms of distance on the roadway, the unit disclosed herein can separate information coming from two detectors detecting vehicles to within about 1/80 of an inch of each other when vehicles are traveling at approximately 60 miles per hour.

The principal object of this invention is to provide a circuit which is capable of accurately counting a plurality of random received actuations, some of which are substantially coincident and which can provide a usable, accurate output where the rate of discrete input signals is at times temporarily greater than the rate of output signal capability in a system where the average rate of output signals is greater than the average rate of input signals.

It is a further object of this invention to provide a transistorized counting unit having no moving mechanical parts, resulting in a relatively trouble-free unit which may be used in unattended field operation under a wide variety of climatic conditions.

It is another object of this invention specifically to provide a unit which will give an accurate count of vehicular traffic on multilane highways in conjunction with multiple detectors.

It is still a further object of this invention to provide such a counting circuit with which a variety of forms of output units may be utilized.

Essentially the invention consists of providing several input channels—for individual traffic detectors—each channel having a very short pulse forming and shaping network—from the longer and variable length traffic detector pulse output. These input channels feed into a common input of a first traffic pulse binary counting chain of flip-flops (1–2–4, for example) which feeds a free running multivibrator through a clamping circuit. A second similar binary counting chain of flip-flops is provided and a comparator compares the two counting chains and if they are in coincidence, controls the clamping circuit to stop the multivibrator, but if not in coincidence then to unclamp the multivibrator to allow it to proceed. Thus, upon receipt of traffic pulses, the first counter is advanced to unclamp the multivibrator and provide a useful output representative of the input pulse and at the same time the multivibrator output signal advances the second counter, continually providing an output signal through the comparator, until the two counters are coincident, at which time the multivibrator is again clamped.

Thus, random traffic pulses, which may occur at times for a brief series at too fast a rate for an external counter, computer or recorder, may be applied at a slower rate to the latter by this accumulator so long as the average rate of receipt of traffic pulses does not exceed the average rate of output pulses (multivibrator pulse rate, for example) and so long as sufficient stages of the binary chain are provided to care for the maximum series of faster traffic pulses.

Figure 1B:
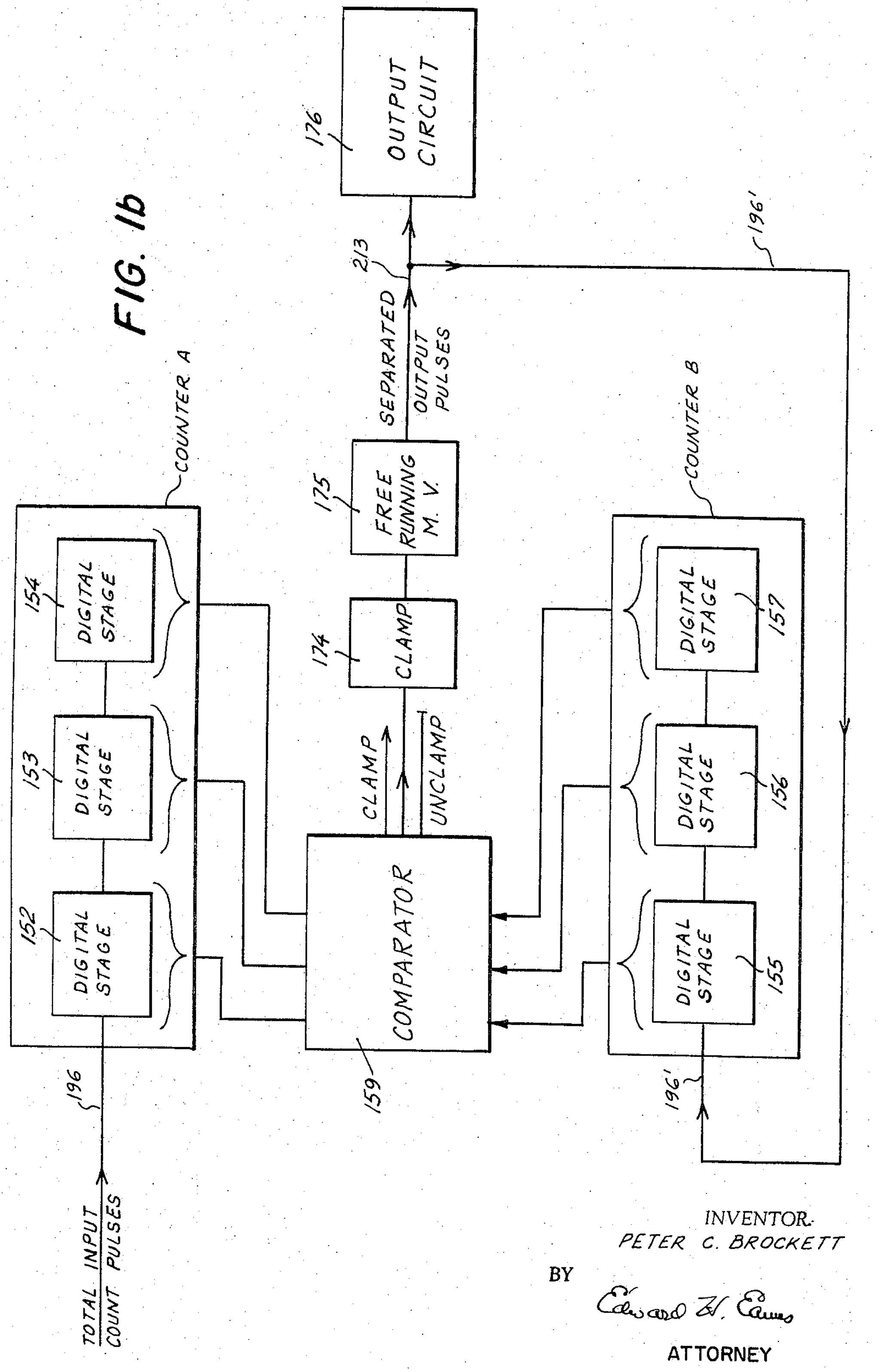
Figure 2:
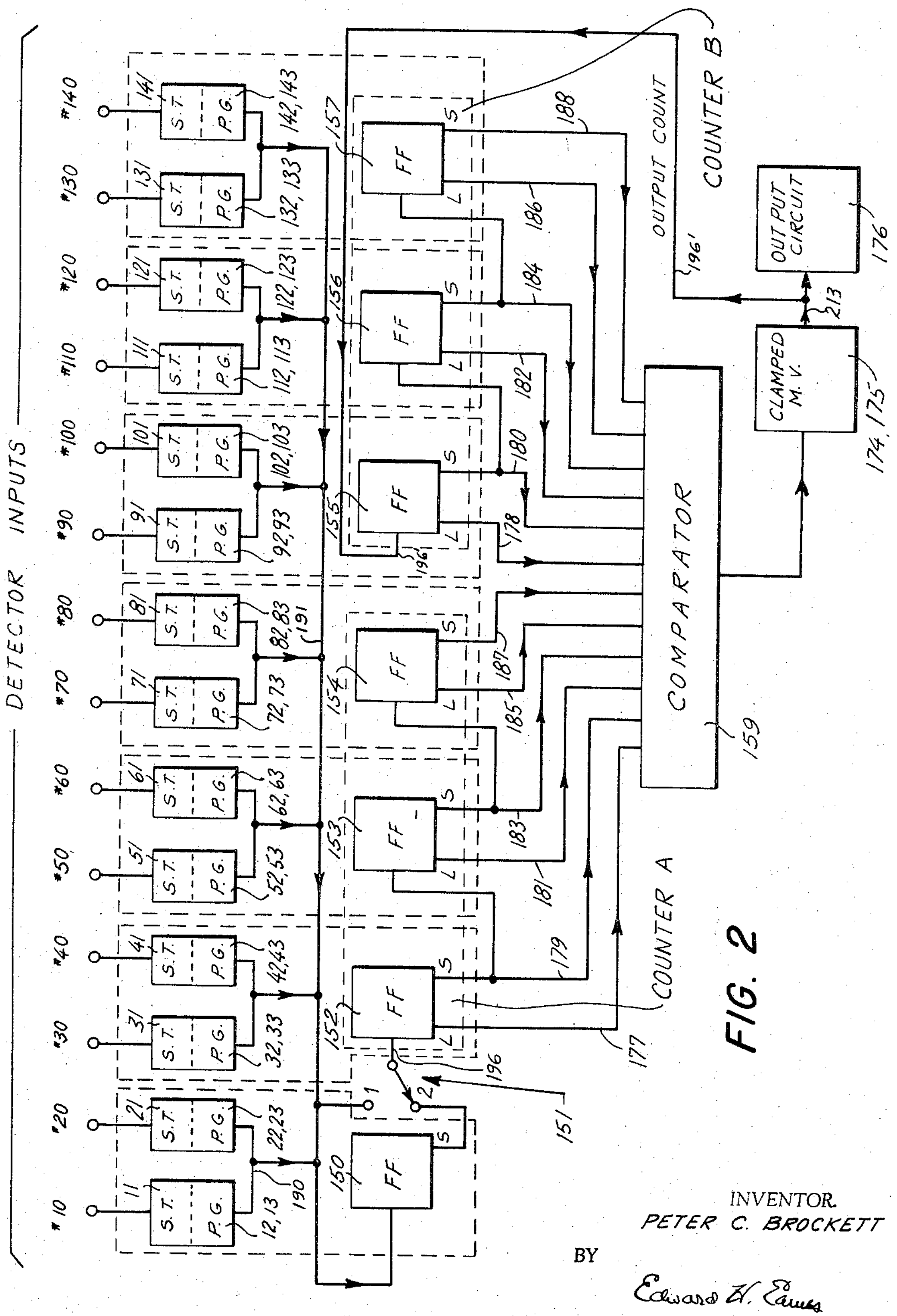
Figure 3:
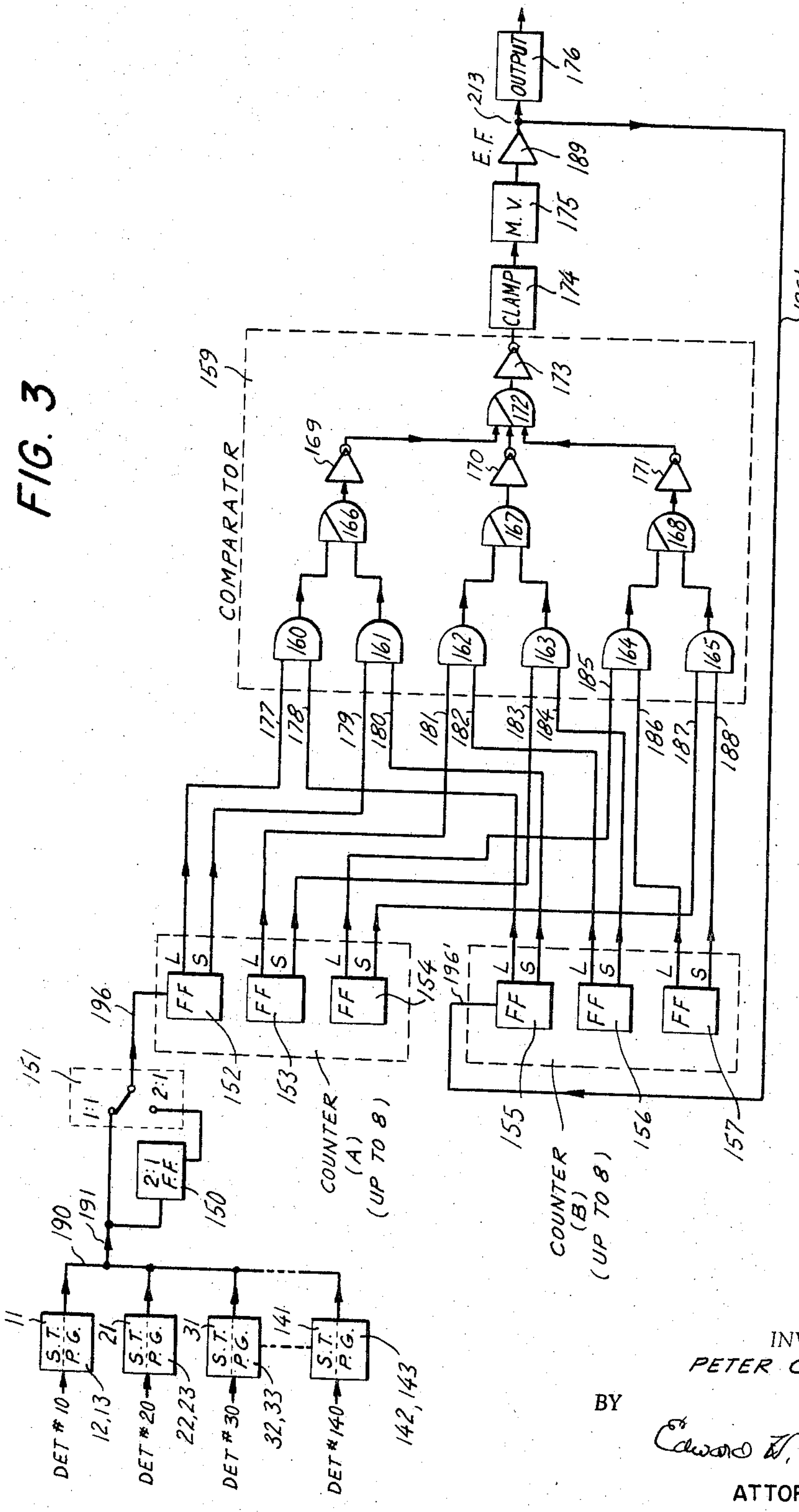
Figure 4:
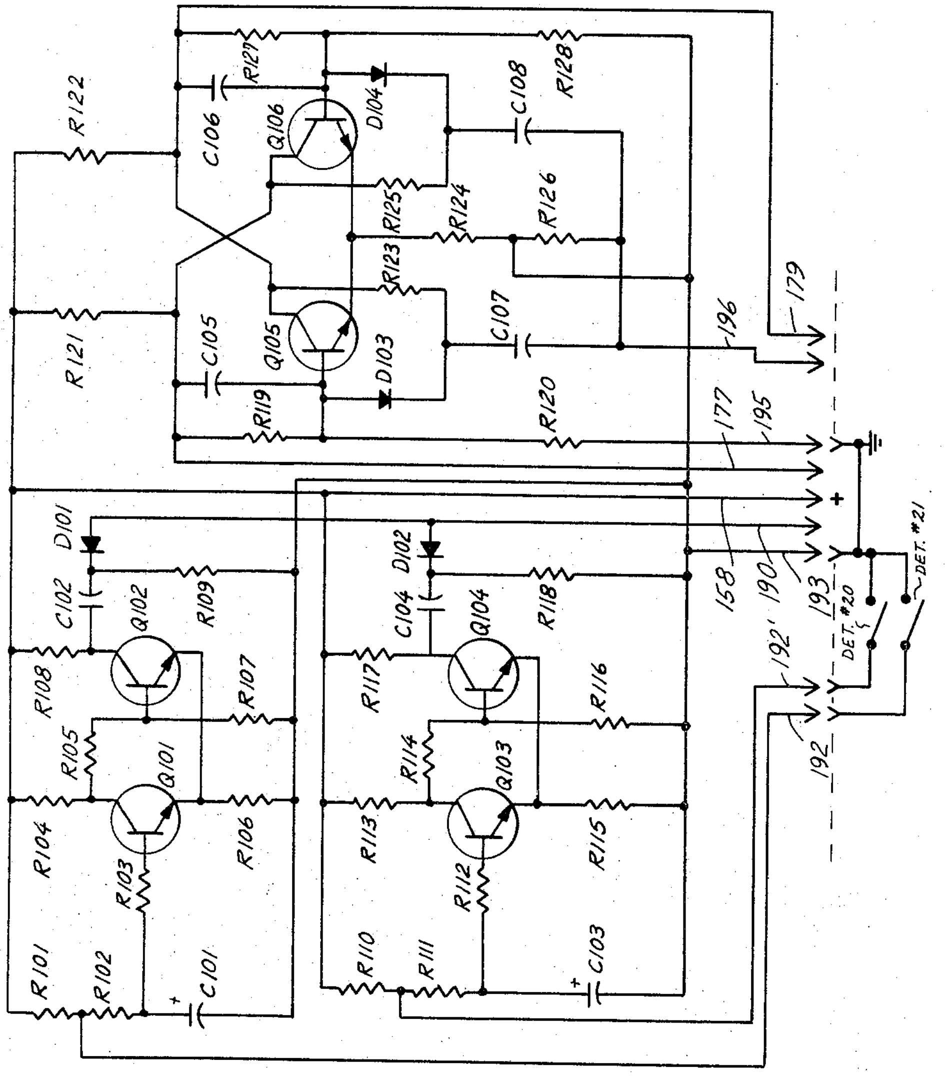
Figure 5:
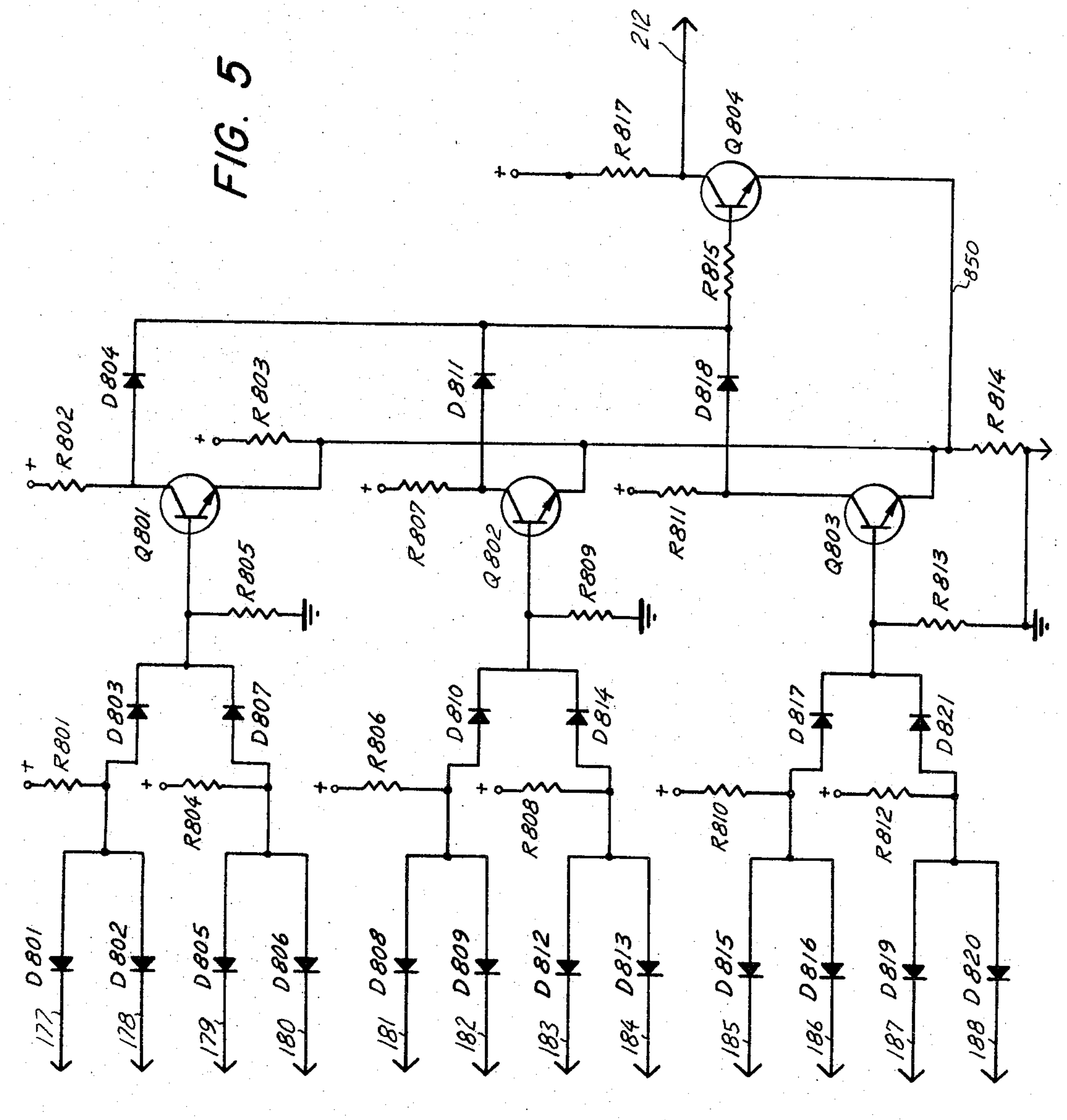
Figures 6, 7:
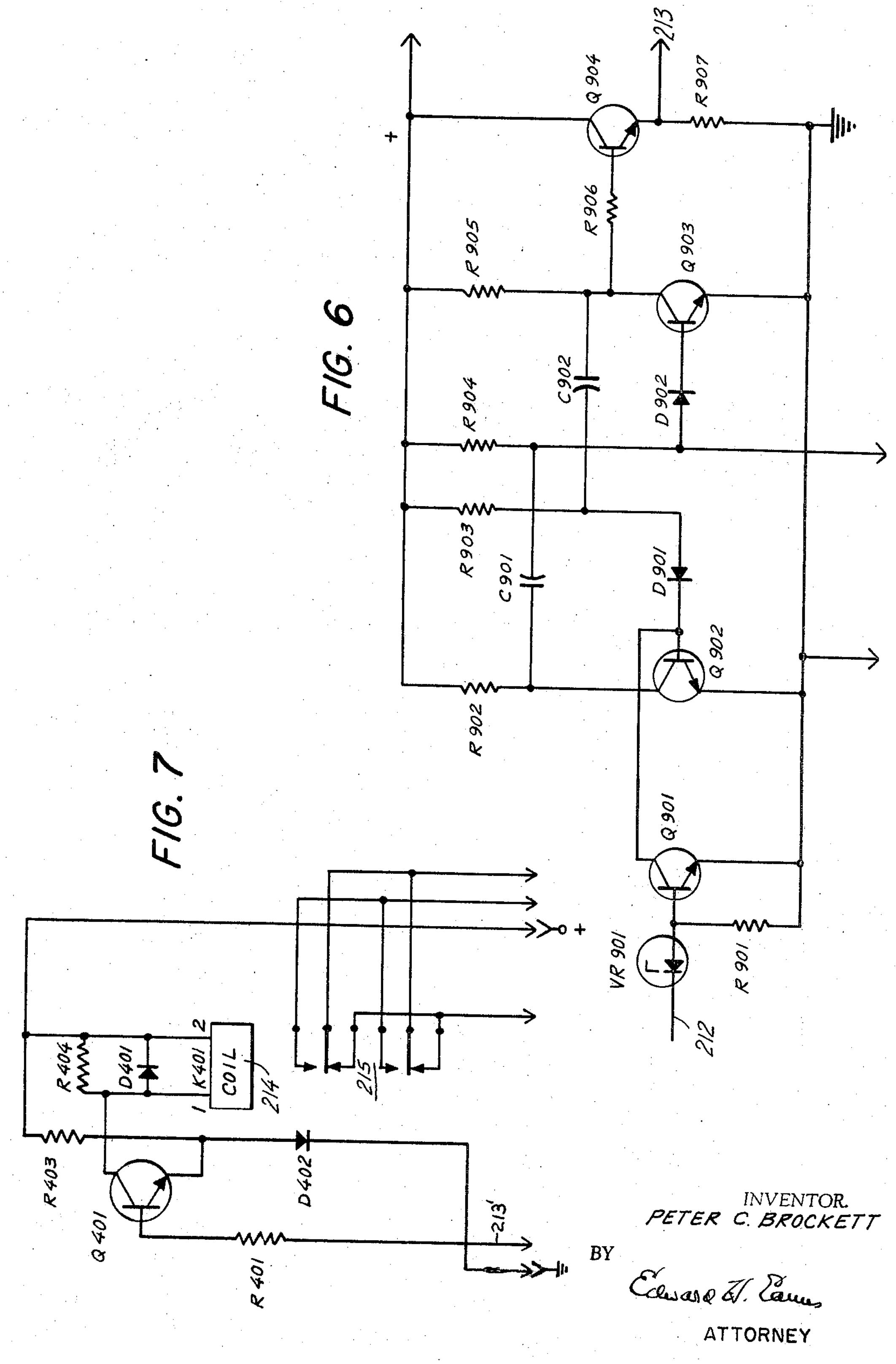
Figure 8:
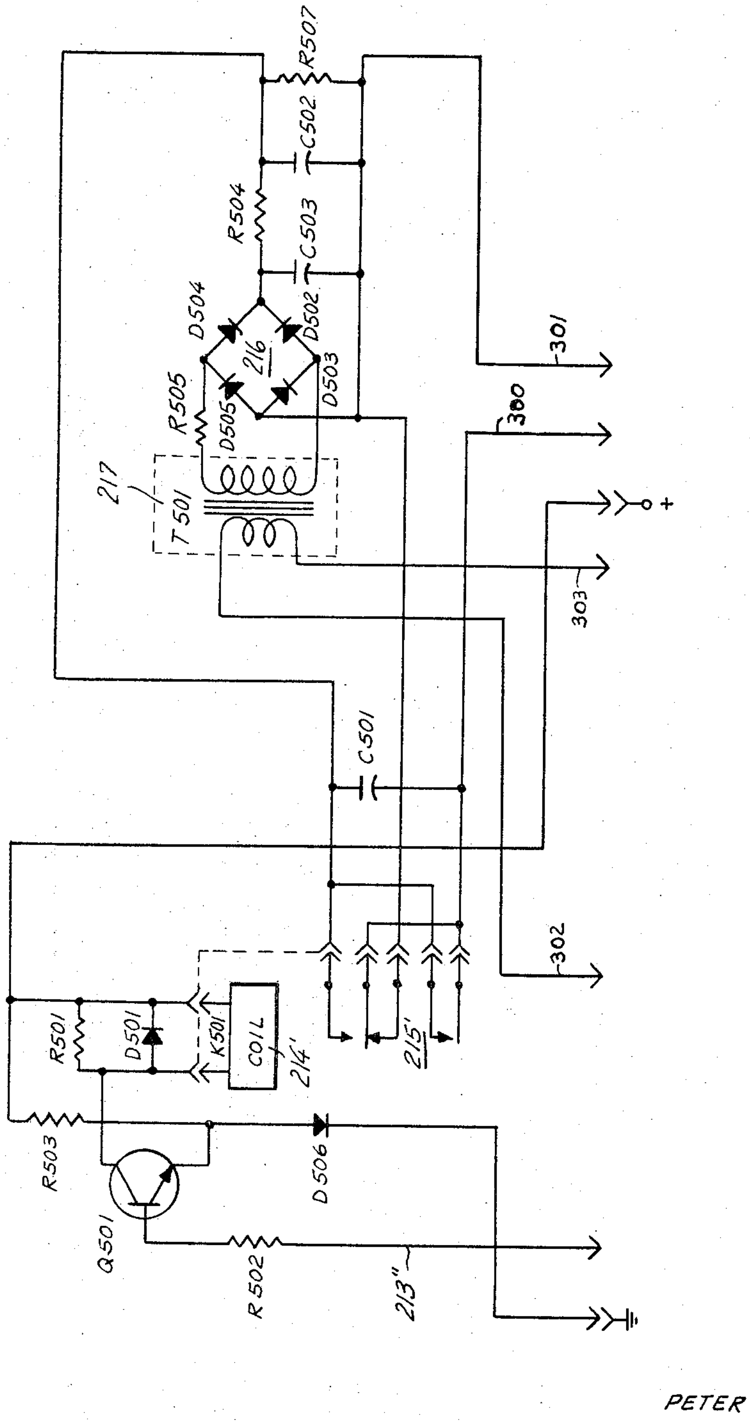
Figure 9:
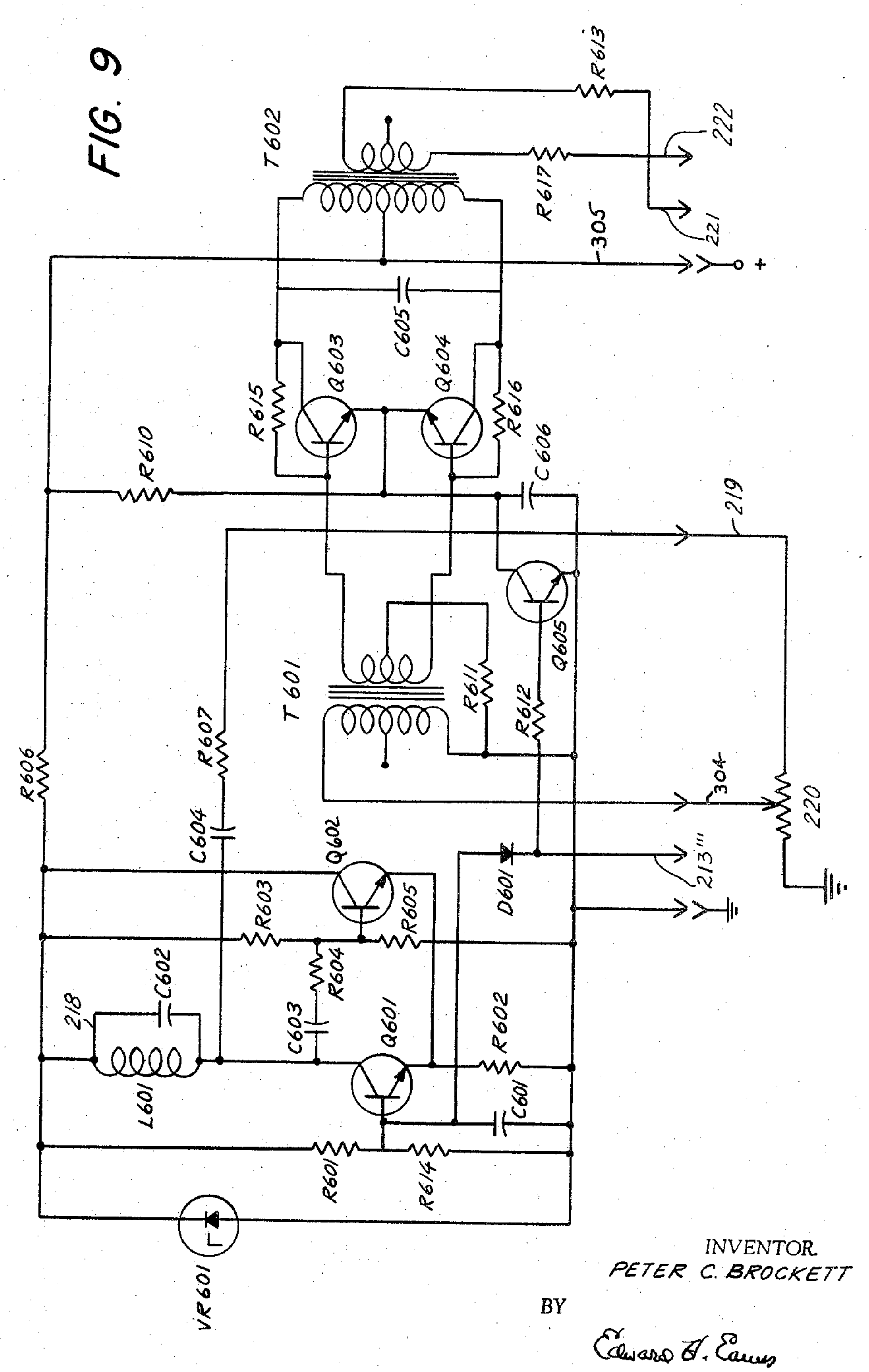

A counting circuit in accordance with the teachings of this invention and a traffic control application of the circuit is described herein with reference to the drawings in which:

FIGS. 1A and 1B together are a block diagram of the system with 4 detector inputs shown; FIG. 2 is a block diagram of the system with 14 detector inputs; FIG. 3 is a logic diagram of the system; FIG. 4 is a schematic of a portion of the circuitry of the system, including two circuit input trigger circuits, two pulse generators; two pulse clippers and a flip-flop unit; FIG. 5 is a schematic of the circuitry of the comparator unit of the system; FIG. 6 is a schematic of the circuitry of the clamped multivibrator utilized in the system; FIG. 7 is the schematic for one form of output circuitry referred to as the relay output; FIG. 8 is a schematic for another form of output referred to as the pulse output circuitry; and FIG. 9 is the schematic for still another form of output referred to as the tone output circuitry.

The system will first be described from the point of view of its overall operation with reference to FIGS. 1A, 1B, 2 and 3. The circuitry will thereafter be described with reference to the schematic drawings.

The unit operates top rovide a recordable count from a plurality of detectors such as from multiple lanes of a multilane highway. Fourteen detectors are shown in FIG. 2 and indicated individually by the numerals 10, 20, 30, 40, 50, 60, 70, 80, 90, 100, 110, 120, 130 and 140. Each detector has asociated therewith a trigger circuit of the type often referred to as a Schmitt trigger, a spike pulse generator and a positive spike pulse clipper.

In the figures, the Schmitt trigger associated with each of the detectors is respectively indicated by the numeral 11, 21, 31, 41, 51, 61, 71, 81, 91, 101, 111, 121, 131 and 141; each of the spike pulse generators is respectively indicated by the numeral 12, 22, 32, 42, 52, 62, 72, 82, 92, 102, 112, 122, 132 and 142; and each of the positive spike pulse clippers is respectively indicated by the numeral 13, 23, 33, 43, 53, 63, 73, 83, 93, 103, 113, 123, 133 and 143. The output of each pulse clipper is a negative spike pulse. The outputs of all of the pulse clippers are paralleled into a 2 to 1 scaling flip-flop 150 as well as to a position on the ratio switch 151 which can by-pass the ratio flip-flop 150 and feed the detector information directly into the "unit" position of binary counter "A."

There are two counters in the unit, namely, counter A and counter B. These two counters, which can count up to 8 in 3 flip-flops each are independent of each other and the output of each of these counters is gated through a series of gates. In the figures, the first counter, A, includes flip-flops 152, 153 and 154, while the second counter, counter B, includes flip-flops 155, 156 and 157.

The output of the first binary counter, A, composed of flip-flops 152, 153 and 154, is applied to comparator 159 and, specifically, to "AND" gates 160, 161, 162, 163, 164 and 165. The outputs of the "AND" gates are fed into a series of "OR" gates 166, 167 and 168. The 3 outputs of the "OR" gates after going through their respective inverter-amplifiers 169, 170 and 171 are gated through a 3 input "NOR" gate, 172. The output of coincidence gate 172 through its inverter-amplifier 173 is applied to clamping circuit 174 of multivibrator 175 in order to unclamp the clamped multivibrator, so that an output pulse is generated at the output of multivibrator 175, which, in turn, activates output circuit 176.

The output pulse generated by multivibrator 175 and which energizes output circuit 176, is the input pulse to actuate counter B composed of flip-flops 155, 156 and 157.

When counters A and B are in step and the condition of all 6 flip-flops, 152, 153, 154, 155, 156 and 157 are identical, the output of the comparator 159, will be positive so that the clamping circuit 174 will prevent multivibrator 175 from oscillating and, as a result, no output is obtained.

Referring to FIG. 3, each of the flip-flops, 152, 153, 154, 155, 156 and 157 is shown having two outputs, one of which is indicated by L and the other by S. In order to more clearly understand the logic diagram in FIG. 3, it will be assumed that initially all the L outputs were "up" and the S outputs "down." Each of the indicated inputs to "AND" gates 160, 161, 162, 163, 164 and 165 has a numeral applied thereto in FIG. 3, from 177 through 188, respectively. When a count comes into flip-flop 152 under these conditions, the L output will go "down" and the S output will go "up." This will upset the input to "AND" gates 160 and 161. Since inputs 179 and 180 were "down" to begin with, changing one of them to "up" does not affect its output, but on the other hand changing input 177 to "AND" gate 160 from "up" to "down" will upset the coincidence in gate 160, which, through the remainder of the chain of gates, amplifiers and inverters, will upset the coincidence condition at "NOR" gate 172 and, as a result, multivibrator 175 will be unclamped through actuation of clamp circuit 174 and a pulse generated at its output and applied to output circuit 176 through emitter-follower 189. Under these conditions, an output signal has been produced indicative of a traffic actuation, as the pulse applied at flip-flop 152 was applied through initiation at traffic detector 10.

The pulse thus produced at the output of multivibrator 175 is also applied at the input of flip-flop 155 and reverses the condition of flip-flop 155 in counter B; therefore, output L in flip-flop 155 goes "down" and output S goes "up," corresponding to the same condition as the condition of flip-flop 152 in counter A, after the application of the signal from detector 10. Coincidence in all of the gates is therefore again restored and multivibrator 175 is clamped at the end of the first negative half cycle in its output. A similar sequence of events occurs at successive traffic actuations coming into the system.

Thus, in the example set forth above, the first binary counter A has counted the detector pulse which it received at an unregulated rate and the second binary counter B, has counted to the same number, thereby matching the first binary counter at a constant, controlled rate.

The input signals to flip-flop 155, in the event several successive actuations have occurred at detector 10, or the other detectors, is at the rate of output of multivibrator 175 and immediately independent of rate of input of counter A by the detectors. The system therefore operates as a "follow-up" or "information-storage" system when the pulse rate into counter A is slower or faster respectively than the signal output rate of multivibrator 175.

Referring to FIG. 2, the individual traffic detectors 10, 20, 30, 40, 50, 60, 70, 80, 90, 100, 110, 120, 130 and/or 140, produce a relatively long pulse output of variable lengths. The Schmitt trigger and pulse forming and shaping network develop short, well-defined, usable pulses. Comparator 159 compares the counting chains of counters A and B and, if they are in coincidence, controls clamping circuit 174 to stop multivibrator 175. If they are not in coincidence, the multivibrator 175 is unclamped, allowing it to proceed at its design rate. Thus, whenever traffic pulses have advanced the first counting chain of counter A beyond the second counting chain of counter B, the second is advanced at the pulsing rate of multivibrator 175 to provide output pulses at the latter rate until the second chain is again in coincidence with the first.

It is apparent, therefore, that random traffic pulses, which may at times occur for a brief series at too fast a rate for an external counter, may be applied at a slower rate to the recorder at output 176 by the circuit disclosed herein so long as the average rate of receipt of traffic pulses at the detectors does not exceed the average rate of output pulses of the multivibrator and so long as sufficient stages of the binary chain in counter A or B are provided to care for the maximum series of faster traffic pulses.

A schematic of the circuitry of triggers 11 and 21, pulse generators 12 and 22, clippers 13 and 23, and flip-flop 152 is shown in FIG. 4. Each Schmitt trigger, 11 and 21, is independent of the other. The trigger circuits are the same for each detector. An explanation of the operation of trigger circuit 11, differentiating circuit 12 and clipper 13 associated with detector 10 will first be given. Trigger 11 consists of two NPN transistors, Q101 and Q102, with associated resistors, R101, R102, R103, R104, R105, R106, R107 and R108, and condensor C101. The input to trigger 11 appears at lead 192, which comes directly from detector 10. Lead 193 is the ground lead and activation of detector 10 by a vehicle passing thereover engages lead 192 electrically with lead 193, thus grounding the input to the trigger circuit.

Transistor Q101 is normally conducting, and transistor Q102 is normally non-conducting. The lead indicated by the numeral 158 supplies positive voltage, so that, in the absence of an input signal at lead 192, the base of transistor Q101 is positive and transistor Q101 is conducting, with transistor Q102 nonconducting. Upon actuation of detector 10, the base-emitter voltage of transistor Q101 is changed and a relatively negative going pulse is applied, causing transistor Q101 to become nonconducting and transistor Q102 to become conducting, so that the collector of transistor Q102 moves toward ground. Transistor Q102 remains conducting and transistor Q101 remains nonconducting until lead 192 becomes ungrounded as the vehicle leaves detector 10. Thus, trigger 11 supplies a square wave or pulse with sharply defined leading and trailing edges.

Collector Q102 feeds pulse generator 12, consisting of capacitor C102 and resistor R109, which is a differentiating circuit providing narrow spike pulses upon the passage of the edges of the output from transistor Q102. A negative pulse is produced upon detector contact closure and a positive pulse is produced upon opening. Diode D101 allows only the negative or leading edge pulse to pass while blocking the positive or trailing edge pulse. Hence, a spike pulse appears at lead 190, which is representative of the activation of detector 10 at the instant a vehicle engages the detector.

Trigger 21, with its associated pulse generator and pulse clipper, consisting of transistors Q103 and Q104, resistors R110 through R118 and capacitors C103 and C104 and clipper diode D102, receiving its input at lead 192 from detector 20 and providing its output signal at lead 190, operates in the same manner as does the triggering and pulse forming circuitry associated with the other detectors.

The outputs of all of the clipper circuits in association with all of the detectors is fed to lead 191 where they pass through flip-flop 150 or by-pass flip-flop 150 to be fed into counter A in accordance with the positioning of switch 151.

Flip-flop 152 is also shown in schematic in FIG. 4, comprising two NPN transistors, Q105 and Q106, with associated circuitry consisting of resistors, R119, R120, R121, R122, R123, R124, R125, R126, R127 and R128; capacitors, C105, C106, C107 and C108; and diodes, D103 and D104.

Flip-flop 152 is a saturated bistable, multivibrator circuit, with lead or terminal 196 providing the input, terminals 177 and 179 the two "on-off" outputs; and with terminal 195, which is the reset point, grounded. Positive D.C. voltage is supplied at lead 158.

In the reset condition, transistor Q105 is heavily conducting, whereas, transistor Q106 is at cut-off producing a high, positive voltage at terminal 177, and a near-zero voltage at terminal 179. A negative pulse applied at terminal 196 reverses the condition of the two transistors from conduction to cut-off or cut-off to conduction, resulting in the reversal of the output conditions at terminals 177 and 179. A positive pulse applied to terminal 195 resets the flip-flop to the condition where terminal 177 is "up" (high potential-transistor Q106 cut-off), and terminal 179 "down" (low potential-transistor Q105 conducting).

Flip-flops 152, 153, 154, 155, 156 and 157, and ratio flip-flop 150, are identical and the multivibrator in the schematic of FIG. 4 as well as the description of its operation can be applied to each of these identical flip-flops.

The outputs of flip-flops 152, 153, 154, 155, 156 and 157 have been indicated respectively by the numerals 177, 179, 181, 183, 185, 187, 178, 180, 182, 184, 186 and 188, and these outputs are fed into comparator 159, the schematic of which is shown in FIG. 5, wherein the combination of diodes D801, D802 and resistor R801 constitutes an "AND" gate, which is the "AND" gate indicated by the numeral 160 in FIG. 3. Likewise, the combination of diodes D805, D806 and resistor R804 constitutes "AND" gate 161. Diodes D808 and D809 in combination with resistor R806 form "AND" gate 162. Diodes D812 and D813 with resistor R808 constitutes "AND" gate 163. The combination of diodes D815, D816 and resistor R810 constitutes "AND" gate 164, and the combination of diodes D819, D820 with resistor R812 constitutes "AND" gate 165.

The combination of diode D803 and diode D807 forms the "OR" gate 166 and, smilarly, diodes D810 and D814; and D817 and D821 form, respectively, "OR" gates 167 and 168.

The junction of resistor R801 and diode D803 will be "up" only when both the signals at lead 177 and 178 are "up." When the signal at either lead 177 or 178, or both, is "down," the junction will be "down." The remaining "AND" gates, 161, 162, 163, 164 and 165 are identical to gate 160 and the "OR" gates, 167 and 168, are identical to "OR" gate 166.

The output of the first two "AND" gates, 160 and 161, is fed into "OR" gate, 166. When either one of the inputs to "OR" gate 166 is "up," a voltage drop occurs across resistor R805 which biases transistor Q801 to conduction.

The same explanation applies to the other two "OR" gates 167 and 168. Under quiescent condition when no inputs are received from the detectors, the output of one of the "AND" gates 160 or 161 will be "up," while the other is "down," so that the transistors Q801, Q802 and Q803 will all be forward biased.

The three transistors, Q801, Q802 and Q803 are amplifiers used also as inverters, since a negative voltage or pulse applied to the base of one will produce a positive pulse at its collector.

The voltage divider formed by resistor R803 and resistor R814 holds the emitter voltage of amplifiers 169, 170 and 171 slightly positive and momentarily grounding the base will cause the transistor to cut-off and the collector voltage will consequently rise, producing the positive pulse.

The three diodes D804, D811 and D818, in conjunction with transistor Q804 form the "NOR" gate 172, the inputs of which are connected to the collectors of transistors Q801, Q802 and Q803. When the counters A and B are in coincidence, these three transistors are all conducting and their collectors will be "down" or only slightly positive, holding the common junction of the diodes and resistor R815 only slightly positive, which is less positive than the emitter of Q804.

Transistor Q804 is biased just below cut-off with the emitter positive via line 850 and will remain at cut-off as long as all three transistors, Q801, Q802 and Q803 remain conducting. In the event any one of these three transistors goes to cutoff, the voltage at resistor R815 rises, driving transistor Q804 to conduction and the voltage at the collector of transistor Q804 "down." Thus, lead 212, which is normally held at positive potential, momentarily goes "down" toward ground potential. This drop in potential unclamps the "clamp" of multivibrator 175.

The circuitry for multivibrator 175 is shown in FIG. 6 and this multivibrator is an astable multivibrator, composed of transistors Q902 and Q903 with associated resistors and capacitors. Zener VR901 and transistor Q901 constitute the "clamp." Transistor Q904 is an emitter-follower. The output of the circuit is at terminal 213. Resistors R902 through R905 are associated with the multivibrator 175 and capacitors C901 and C902 and diodes D901 and D902 are also part of the multivibrator circuitry. Resistors R906 and R907 are components of the emitter-follower.

Normally, the input at lead 212 to Zener VR901 is held positive so that the current through the Zener and resistance R901 produces a positive bias on the base of transistor Q901. In this condition, transistor Q902 is biased to cut-off, allowing transistor Q903 to conduct. Grounding lead 212 cuts off transistor Q901, which releases the multivibrator, reversing the state of transistor Q902 and transistor Q903, so that transistor Q903 is cut-off and transistor Q902 is conducting.

Transistor Q904 in the emitter-follower stage, which is biased by the voltage at the collector of Q903, is at cut-off in the clamped condition of the multivibrator 175, but goes into conduction when transistor Q903 goes to cut-off, thus producing a positive voltage at terminal 213, the output terminal.

The output at 213 is fed into output circuit 176 and via lead 196′ into the input of flip-flop 155 of counter B. Line 196 of the flip-flop circuit in FIG. 4 may illustrate such input.

Three different output circuits are shown in FIGS. 7, 8 and 9.

FIG. 7 is a schematic of one form of output circuit which is the relay output for direct connection to a local counter. The relay is composed of a sensitive relay, the coil of which is indicated by the numeral 214 and the contacts by the numeral 215. The relay is driven by transistor Q401 which is normally biased to cut-off. A positive signal at lead 213' received from lead 213 of multivibrator 175 drives this transistor to conduction, resulting in the energization of the relay. Diode D401 across coil 214 reduces the inductive kick of the relay. The contacts of the relay are parallel for higher current-carrying capacity as well as higher reliability.

A second output circuit is shown in schematic in FIG. 8. This circuit is a D.C. supply, the output of which is applied to the output leads 300 and 301 by relay contacts 215'. A full bridge rectifier, 216, composed of diodes D502, D503, D504 and D505, fed by the step-up transformer 217 connected to A.C. voltage by leads 302 and 303, supplies D.C. voltage at leads 300 and 301, which is filtered by capacitors C503 and C502 and resistor R504.

The relay driving transistor, Q501, is normally biased to cut-off and upon a positive voltage applied to its base 213'' from lead 213 of multivibrator 175 goes into conduction and operates relay K501. Diode D501 acts as a suppressor across coil 214'.

The third output which is the "tone" output is shown in schematic in FIG. 9.

Transistor Q601 and associated circuiting including the tuned circuit 218 formed of inductor L601 and capacitance C602 provides an oscillator. Transistors Q603 and Q604 with associated circuiting provides a push-pull amplifier. Both the oscillator circuit and the push-pull amplifier are triggered upon receipt of a pulse at lead 213''' from lead 213 of multivibrator 175.

The combination of values of inductor L601 and capacitor C602 determine the frequency of oscillation of transistor Q601 and its related circuitry.

Transistor Q602 is an emitter-follower with capacitor C603 and resistor R604 providing oscillator feedback. The values of capacitor C603 and resistor R604 do not affect the frequency of oscillation.

The output of the oscillator is applied through capacitor C604 and isolating resistor R607 to lead 219 which is grounded through potentiometer 220. The moving arm of the potentiometer 304 is connected to the primary of transformer T691. The potentiometer acts as an output level control for the encoder by controlling the signal level to the primary of transformer T601.

The secondary of transformer T601 feeds the push-pull transistorized amplifier utilizing transistors Q603 and Q604. Both the oscillator and the push-pull output circuits are keyed simultaneously by an external signal fed at 213''', keying the oscillator through diode D601 and the trigger transistor Q605 through resistor R612. Transistor Q605, which is at cut-off holds the common emitter point of transistor Q603 and transistor Q604 at approximately the direct current supply level of lead 305, which keeps these two transistors also at cut-off and a positive signal at lead 213''' forces transistor Q605 into conduction. Therefore, the collector voltage of transistor Q605 decreases so that the oscillator output fed to the push-pull stage is amplified and applied to output leads 221 and 222 through the secondary of the line matching output transformer T602.

Feedback for output stabilization is provided by resistors R615 and R616 between collector and base of transistor Q603 and transistor Q604, respectively. Capacitor C606 absorbs transient pulses which occur at the instant transistor Q605 releases. Resistors R613 and R617 are impedance matching elements to produce a balanced impedance.

Since the trigger voltage supply at lead 213''' is approximately $\frac{1}{10}$ of a second in duration, the output at leads 221 and 222 will be a burst of A.C. signal at a frequency determined by the L.C. constants, but in all cases with a duration of $\frac{1}{10}$ of a second. This, of course, can be adjusted by modification of the parameters.

Therefore, there has been provided a traffic vehicle counting system for receiving random and sporadic pulses in response to random and sporadic actuations of a vehicle detection apparatus and for providing an output proportional to the pulses. The proportional output is accurately developed, even though vehicle actuations occur substantially simultaneously and at a rapid rate.

The very high speed action of the solid state circuitry as illustrated in the trigger circuits, flip-flops and related circuitry in the multistage binary counters in the preferred circuitry, for example, permits pulses from different vehicles or vehicle axles to partially overlap, and still be separately counted, so long as the front edges of the overlapping pulses are separated in time by at least about 10 microseconds, thus permitting the outputs of multiple traffic detectors of multilane roads or other multiple traffic sources to be combined in high accuracy counting.

Thus, among others, the several objects in the invention, as specifically aforenoted, are achieved. Obviously, numerous changes in construction and re-arrangement of parts might be resorted to without departing from the spirit of the invention as defined by the claims.

I claim:

1. A traffic vehicle counting system for receiving random and sporadic pulses in response to random and sporadic actuation of a vehicle detection apparatus and for providing an output proportional to said pulses, including in combination vehicle actuated means for providing a pulse in response to and corresponding to a vehicle passing through a sampling point, first sequential stepping means, second sequential stepping means substantially identical to said first sequential stepping means, a circuit matrix sensing the output conditions of said first and second sequential stepping means and providing an output in response to nonmatching output conditions of said first and second sequential stepping means, a periodic pulse generator responsive to the output of said matrix to provide output pulses at a predetermined rate, means applying the output of said vehicle actuated means to said first sequential stepping means for changing its output conditions sequentially to advance one step in response to each pulse of said random and sporadic pulses, means applying the output of said pulse generator to said second sequential stepping means for changing its output condition sequentially to advance one step in response to each pulse of said pulse genrator, whereby said pulse generator is continually actuated to so apply its output pulses whenever said first sequential stepping means and said second sequential stepping means have unmatched output conditions.

2. A traffic vehicle counting system for receiving random and sporadic pulses in response to random and sporadic actuation of a vehicle detection apparatus and for providing an output proportional to said pulses, including in combination vehicle actuated means for providing a pulse in resopnse to and corresponding to a vehicle passing through a sampling point, first sequential stepping means operated by said actuated means for changing its output condition sequentially by advancing one step in response to each pulse of said random and sporadic pulses, a second sequential stepping means substantially identical to said first sequential stepping means, a circuit matrix sensing the output condition of said first and second sequential stepping means and providing an output in response to nonmatching output conditions of said first and second sequential stepping means, a periodic pulse generator for providing a chain of substantially constant output pulses at predetermined time spacing, means actuating said pulse generator for terminating said chain of output pulses in response to a predetermined output signal from said matrix, and means applying the output of said pulse generator to said second sequential stepping means in response to nonmatching output of said matrix for substantially matching the output condition of said first sequential stepping means by advancing said second stepping means one step sequentially in response to each pulse of said pulse generator.

3. A traffic vehicle counting system for receiving random and sporadic pulses in response to random and sporadic actuation of a vehicle detection apparatus and for providing an output proportional to said pulses, including in combination vehicle actuated means for providing a pulse in response to and corresponding to a vehicle passing through a sampling point, a periodic pulse generator for developing a chain of substantially constant output pulses at predetermined time spacing, a clamping input circuit of said pulse generator for actuating said pulse generator to terminate the pulse output thereof in response to a clamping control signal, first sequential stepping means, second sequential stepping means substantially identical to said first sequential stepping means, a circuit matrix for sensing and comparing the output conditions of said first and second sequential stepping means, said matrix developing a clamping control signal in response to matching output conditions of said first and second sequential stepping means, means applying the output of said vehicle actuated means to said first sequential stepping means for changing its output condition sequentially by advancing one step in response to each pulse of said random and sporadic pulses, and means applying the output of said pulse generator to said second sequential stepping means for substantially matching the output condition of said first sequential stepping means by changing the output condition of said second sequential stepping means sequentially one step at a time in response to each pulse of said pulse generator.

4. A traffic vehicle counting system as in claim 3 and in which first and second sequential stepping means each include a mutlistage counting circuit comprising cascaded bistable solid state switching elements.

5. A traffic vehicle counting system for receiving random and sporadic pulses in response to random and sporadic actuation of a vehicle detection apparatus and for providing an output proportional to said pulses, including in combination a vehicle actuated means for sensing a vehicle passing through a sampling point, a square wave generator activated by said detector and providing a square wave pulse upon actuation, shaping means forming and passing pulse signals from said square wave generator in response to the leading edge of the signal of said square wave generator, first sequential stepping means actuated by the output of said shaping means for changing its output condition sequentially in response to each actuation of said shaping means, a circuit matrix sensing the output condition of said first sequential stepping means and developing an output signal in response thereto, a pulse generator receiving the output of said circuit matrix, second sequential stepping means substantially identical to said first sequential stepping means receiving the output of said pulse generator, said circuit matrix sensing the output condition of said second sequential stepping means, comparison means of said circuit matrix comparing the output of said first sequential stepping means and the output of said second sequential stepping means and developing an output signal in response to nonmatching conditions of said sequential stepping means, and actuation means receiving the output of said circuit matrix and actuating said pulse generator in response thereto.

6. A traffic vehicle counting system for receiving random and sporadic pulses in response to random and sporadic actuation of a vehicle detection apparatus and for providing an output proportional to said pulses in accordance with claim 5 in which said first and second sequential stepping means are binary counters and the circuit matrix is composed of a plurality of "AND" and "OR" gates.

7. A traffic vehicle counting system for receiving random and sporadic pulses in response to random and sporadic actuation of a vehicle detection apparatus and for providing an output proportional to said pulses in accordance with claim 5 in which said pulse generator is a free running multivibrator capable of developing a chain of substantially constant output pulses and said actuation means is a clamping circuit which upon actuation clamps said multivibrator terminating said chain of pulses.

8. A traffic vehicle counting system for receiving random and sporadic pulses in response to random and sporadic actuation of a vehicle detection apparatus and for providing an output proportional to said pulses in accordance with claim 5 in which a ratio switching device is provided between said shaping means and said first sequential stepping means to modify proportionally the signals received by said first sequential stepping means in accordance with actuations of said detector and means are provided associated with said free running multivibrator whereby the output thereof can be modified in accordance with and proportional to the modification effected by said ratio means.

9. A traffic vehicle counting system for receiving random and sporadic pulses in response to random and sporadic actuation of a vehicle detection apparatus and for providing an output proportionl to said pulses including in combination a vehicle actuated detector for providing a pulse in response to and corresponding to a vehicle passing through a sampling point, a Schmitt trigger circuit receiving the signal from said vehicle detector and providing an output in response thereto, a differentiating circuit for receiving the output of said Schmitt trigger and for providing a discrete pulse in response to said output, a first storage means receiving the output of said differentiating circuit, a circuit matrix sensing the storage condition of said first storage means, a free running multivibrator capable of developing a chain of substantially constant output pulses, second storage means receiving the output of said multivibrator, comparison means of said circuit matrix providing an output in response to a nonmatching condition of said first and second storage means, and a clamping circuit activated by the output of said comparison means actuating said free running multivibrator.

10. A traffic vehicle counting system for receiving random and sporadic pulses in response to random and sporadic actuation of a vehicle detection apparatus and for providing an output proportional to said pulses in accordance with claim 9 in which said first and said second storage means are binary counters and the circuit matrix is composed to a plurality of "AND" and "OR" gates.

11. A traffic vehicle counting system for receiving random and sporadic pulses in response to random and sporadic actuation of a vehicle detection apparatus and for providing an output proportional to said pulses in accordance with claim 9 in which a ratio switching device is provided between said differentiating circuit and said first storage means to modify proportionally the signals received by said first storage means in accordance with actuations of said detector and means are provided associated with said free running multivibrator whereby the output thereof can be modified in accordance with and proportional to the modification effected by said ratio means.

12. A traffic vehicle counting system for receiving random and sporadic pulses in response to random and sporadic actuation of a vehicle detection apparatus in accordance with claim 9 in which the output of said free running multivibrator is applied to an amplifier whose output energizes a relay coil to provide an identifiable signal in response to actuations of said vehicle detection apparatus.

13. A traffic vehicle counting system for receiving random and sporadic pulses in response to random and sporadic actuation of a vehicle detection apparatus in accordance with claim 12 in which a D.C. voltage supply is provided and the contacts of the relay associated with said relay coil in one position thereof applies said D.C. voltage to a signal recording device.

14. A traffic vehicle counting system for receiving random and sporadic pulses in response to random and sporadic actuation of a vehicle detection apparatus in accordance with claim 9 in which the output of said multivibrator is applied simultaneously to a tuned oscillator and the switching circuit of an amplifier, said amplifier receiving the output of said oscillator to provide predetermined oscillations in response to a vehicle actuated detector.

References Cited

UNITED STATES PATENTS

| | | | |
|---|---|---|---|
| 3,109,926 | 11/1963 | Bolton | 235—92 |
| 3,252,134 | 5/1966 | Auer | 235—92 |

DARYL W. COOK, *Acting Primary Examiner.*

G. MAIER, *Assistant Examiner.*